(12) United States Patent
Olsen et al.

(10) Patent No.: US 11,243,603 B2
(45) Date of Patent: Feb. 8, 2022

(54) POWER MANAGEMENT OF AN EVENT-BASED PROCESSING SYSTEM

(71) Applicant: Telefonaktiebolaget LM Ericsson (publ), Stockholm (SE)

(72) Inventors: Onar Olsen, Skogås (SE); Per Holmberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 26 days.

(21) Appl. No.: 16/621,483

(22) PCT Filed: Jun. 27, 2017

(86) PCT No.: PCT/SE2017/050709
§ 371 (c)(1),
(2) Date: Dec. 11, 2019

(87) PCT Pub. No.: WO2019/004880
PCT Pub. Date: Jan. 3, 2019

(65) Prior Publication Data
US 2021/0048877 A1   Feb. 18, 2021

(51) Int. Cl.
*G06F 1/3296* (2019.01)
*G06F 1/28* (2006.01)
(Continued)

(52) U.S. Cl.
CPC .............. *G06F 1/3296* (2013.01); *G06F 1/28* (2013.01); *G06F 1/324* (2013.01); *G06F 9/45558* (2013.01); *G06F 2009/45591* (2013.01)

(58) Field of Classification Search
CPC ........ Y02D 10/00; Y02D 30/70; Y02D 30/50; G06F 1/3203; G06F 1/324; G06F 1/329; (Continued)

(56) References Cited

U.S. PATENT DOCUMENTS 6,006,022 A * 12/1999 Rhim .................... G06F 30/331
716/102
6,115,676 A *  9/2000 Rector .................... G01D 4/004
702/62

(Continued)

FOREIGN PATENT DOCUMENTS

WO    2012000540 A1    1/2012
WO    2016101099 A1    6/2016

OTHER PUBLICATIONS

Unknown, Author, "Best Practices for Performance Tuning of Telco and NFV Workloads in vSphere", VMware, Jul. 2, 2015, pp. 1-13.
(Continued)

*Primary Examiner* — Faisal M Zaman
(74) *Attorney, Agent, or Firm* — Murphy, Bilak & Homilier, PLLC

(57) ABSTRACT

There is provided a method and system (200) for power management of an event-based processing system (100). The system (200) is configured to obtain information representing a history of arrival times of events, wherein the information comprises arrival timestamps of the events. The system (200) is configured to determine a measure for power management based on the timestamps of at least two events represented in the information. The system (200) is also configured to perform power management based on the determined measure.

22 Claims, 24 Drawing Sheets

(51) Int. Cl.
*G06F 1/324* (2019.01)
*G06F 9/455* (2018.01)

(58) Field of Classification Search
CPC .... G06F 1/3296; G06F 9/3836; G06F 3/0625;
G06F 1/32; G06F 1/3206; G06F 1/3215;
G06F 1/3243; G06F 1/3268; G06F
2209/501; G06F 2209/5019
USPC ............... 455/67.11, 522; 713/300, 322, 340
See application file for complete search history.

(56) References Cited

U.S. PATENT DOCUMENTS

| | | | | |
|---|---|---|---|---|
| 6,233,691 | B1* | 5/2001 | Atkinson | G06F 12/0802 713/323 |
| 6,285,927 | B1* | 9/2001 | Li | G01C 21/025 701/13 |
| 6,405,329 | B1* | 6/2002 | Colligan | G11B 20/10 714/36 |
| 7,479,912 | B1* | 1/2009 | Xianggang | G06F 3/05 341/144 |
| 8,116,225 | B2 | 2/2012 | Ketheesan et al. | |
| 8,670,205 | B1* | 3/2014 | Malina | G11B 5/012 360/69 |
| 2006/0088056 | A1* | 4/2006 | Quigley | H04L 41/142 370/468 |
| 2008/0267073 | A1* | 10/2008 | Thaler | H04L 47/115 370/236 |
| 2011/0113202 | A1* | 5/2011 | Branover | G06F 12/0831 711/135 |
| 2011/0138197 | A1* | 6/2011 | Lakshmanan | G06F 1/3203 713/300 |
| 2013/0083656 | A1* | 4/2013 | Wigell | H04W 28/02 370/230 |
| 2013/0155045 | A1* | 6/2013 | Khodorkovsky | G06F 1/3206 345/212 |
| 2013/0205149 | A1* | 8/2013 | Chen | G06F 1/3225 713/322 |
| 2013/0329615 | A1* | 12/2013 | Vyas | H04W 52/028 370/311 |
| 2014/0108828 | A1* | 4/2014 | Breternitz | G06F 9/5094 713/300 |
| 2014/0213193 | A1* | 7/2014 | Zhang | G01S 5/06 455/67.11 |
| 2015/0317230 | A1* | 11/2015 | Le Grand | G01D 9/005 702/187 |
| 2015/0340009 | A1* | 11/2015 | Loeffler | G06F 3/1446 345/1.3 |
| 2016/0338145 | A1* | 11/2016 | Bhanage | H04W 12/08 |
| 2016/0353318 | A1* | 12/2016 | Liu | H04L 41/00 |
| 2017/0104561 | A1* | 4/2017 | Agardh | H04L 5/005 |

OTHER PUBLICATIONS

Unknown, Author, "DPDK documentation", Release 16.07.0; DPDK Data Plane Development Kit, Jul. 29, 2016, pp. 1-708.

* cited by examiner

Fig. 18
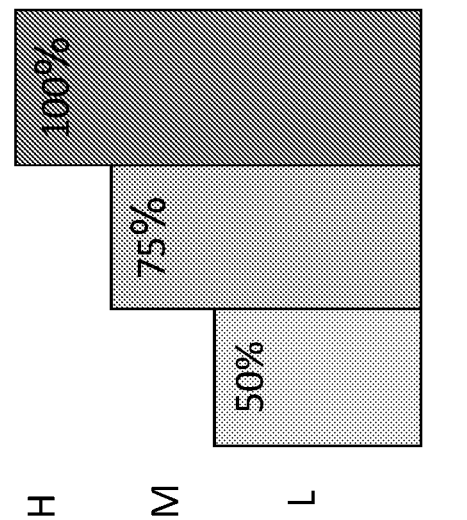
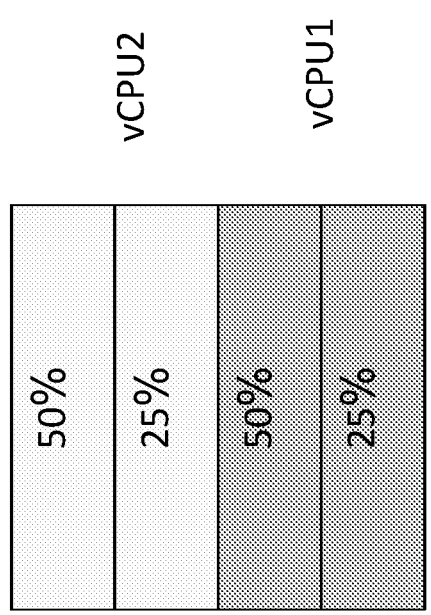
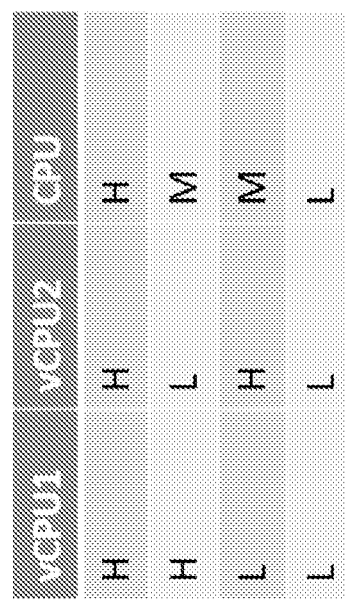

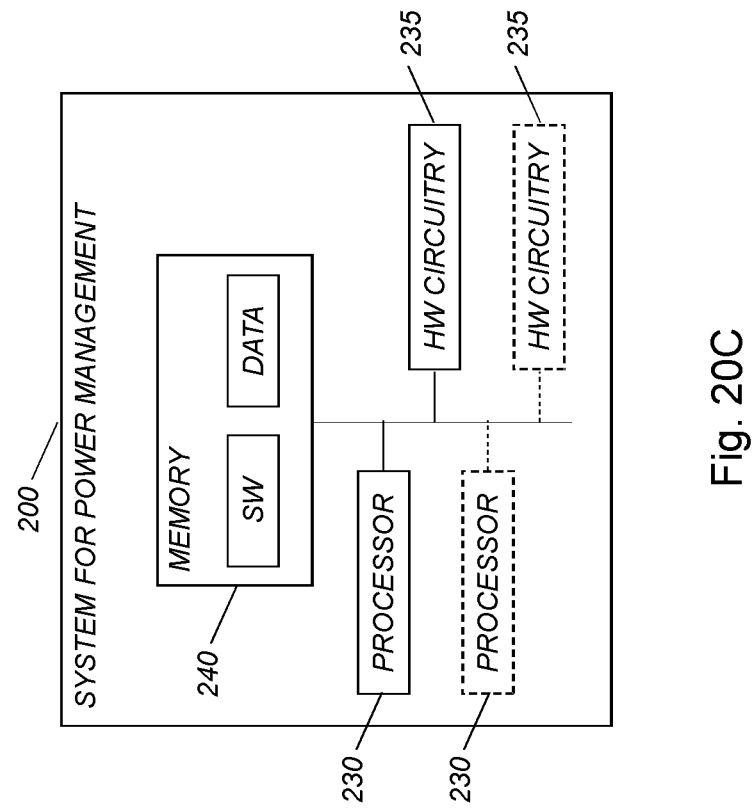
Fig. 20C
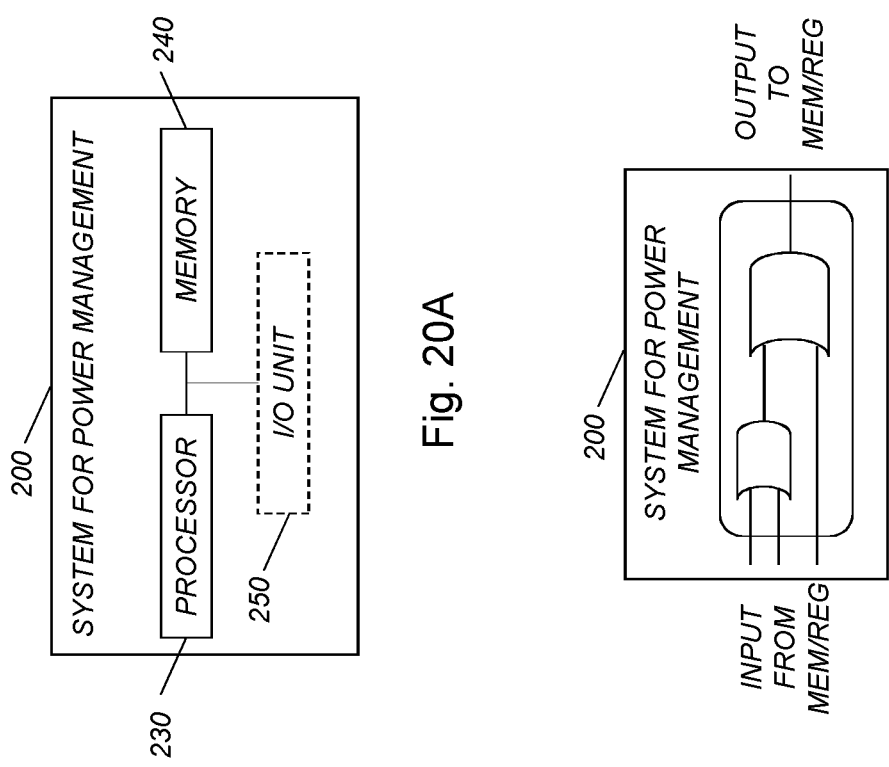
Fig. 20A
Fig. 20B

POWER MANAGEMENT OF AN EVENT-BASED PROCESSING SYSTEM

TECHNICAL FIELD

The proposed technology generally relates to a method and system for power management of an event-based processing system, and a network device comprising such a system, as well as a corresponding computer program and computer-program product and an apparatus for power management of an event-based processing system.

BACKGROUND

Processor power management has originally been designed for maximizing battery life in mobile devices. The same mechanisms have later been reused for data processing in server processors for improving throughput and power efficiency.

However, there has been very limited success in deploying these techniques in event-based processing systems such as processors doing packet processing within wired networks (like IP networks) or within wireless networks. There are two limitations, one is the characteristics of the power managements mechanisms themselves and the other is the way they are controlled by the operating system.

The current solution for large data-centers is to offload lower levels of event processing such as packet processing onto special HW, e.g. SmartNIC, which mitigates the problem by being very optimized and tailored for the workload rather than by intelligent power management.

However, more and more packet processing is performed on server processors, especially Network Function Virtualization, NFV, workloads are by definition executed exclusively on server processors.

Intel provides the Data Plane Development Kit, DPDK, framework for building packet processing within a server environment. In later releases, Intel also implements a power management interface as part of the DPDK, giving the opportunity to shortcut the Linux governors and control power management directly from the packet processing application.

Intel also provide a sample application that bypass Linux governors and implements power control in the networking application, as described in Chapter 18 of the "DPDK Sample Applications User Guide". The application is based on existing L3 Forwarding sample application, with power management algorithms to control the P-states and C-states of the Intel processor. Reference can also be made to WO 2016/101099.

The algorithm uses the number of received and available RX packets on recent polls to make a heuristic decision to scale the processor frequency up/down. Specifically, some thresholds are checked to see whether a specific core running a DPDK polling thread needs to increase frequency by one step based on the near to full trend of polled RX queues. Also, the algorithm decreases frequency by one step if the number of packets processed per loop is far less than the expected threshold or the thread's sleeping time exceeds a threshold.

A common solution today is to disable power management on servers used for NFV in general or poll mode drivers specifically. For example, VMWare describes this in their configuration guide for NFV applications "Best Practices for Performance Tuning of Telco and NFV Workloads in vSphere":

"So our recommendation is to set the BIOS setting for power management to "static high performance," that is, no OS-controlled power management, effectively disabling any form of active power management."

A problem is that high performance SW network stacks work in poll-mode and are busy-waiting. However, the Operating System, OS, mechanisms for power management assumes that applications are idle-waiting. This is the case with lower performing interrupt driven SW network stacks.

Another problem is that the power management methods are designed for use in end-points, either in the terminal or in the server. However, for network equipment, physical or virtual in the Virtualized Network Function, VNF, there is much stricter requirements on latency and jitter.

For example, it is possible to implement a SW network stack that detects low load situations and then changes from working in poll-mode to work as an interrupt driven system. However, this increases latency and also gives a larger jitter.

An additional problem is that conventional power management methods assume a statistical behavior in the network traffic. For example, the sample application provided by Intel uses "trend counters" to track changes in the traffic. This might be true in the context of a large amount of servers in a data center where the traffic is composed of aggregated requests from many users. However, the traffic cases for radio base stations or an access network is that the all available bandwidth can be allocated to a single terminal, i.e. the user peak rate are the same as network peak rate. However, the network traffic is often characterized by unpredictable bursts and it is not possible to rely on "trends".

Another problem with existing solutions is that they are often designed for lower bandwidth interfaces. Higher bandwidth interfaces can receive massive amounts of packets in a very short time, like hundreds of thousands packets in a millisecond. For this reason, power management must react very fast before very long queues build up.

Existing power management methods might include control mechanism for detecting burst by monitoring queue buildup. However monitoring queue buildup also means that the burst is not detected before significant queues have already been built up, which also means that bursts are not detected until after packets have already been delayed.

WO 2012/000540 relates to a method and apparatus for analyzing events representing activity in a communication system.

U.S. Pat. No. 8,116,225 relates to a bandwidth estimation algorithm and more specifically to a method for channel bandwidth estimation based on calculated packet inter-arrival time and burst tracking.

The proposed technology intends to provide improvements that mitigates at least one or more of the above problems.

SUMMARY

It is a general object to improve the power management of event-based processing systems.

It is a specific object to provide a method for power management of an event-based processing system.

It is also an object to provide a system configured for power management of an event-based processing system.

Another object is to provide a network device comprising such a system.

Yet another object is to provide a computer program for performing, when executed by a processor, power management of an event-based processing system.

Still another object is to provide a corresponding computer-program product.

It is a further object to provide an apparatus for power management of an event-based processing system.

These and other objects are met by embodiments of the proposed technology.

According to a first aspect, there is provided a method for power management of an event-based processing system. The method comprises:

obtaining information representing a history of arrival times of events, wherein the information comprises arrival timestamps of the events;

determining a measure for power management based on the timestamps of at least two events represented in the information; and taking a power management action based on the determined measure.

In this way, highly efficient power management of the event-based processing system is obtained.

For example, the proposed technology enables fast and robust power management decisions, allowing for more aggressive power saving mechanisms without introducing unnecessary delays in the event processing and/or keeping the drop rate low.

According to a second aspect, there is provided a system configured for power management of an event-based processing system. The system is configured to obtain information representing a history of arrival times of events, wherein the information comprises arrival timestamps of the events. The system is configured to determine a measure for power management based on the timestamps of at least two events represented in the information. The system is also configured to perform power management based on the determined measure.

According to a third aspect, there is provided a network device comprising the system according to the second aspect.

According to a fourth aspect, there is provided a computer program for performing, when executed by a processor, power management of an event-based processing system. The computer program comprises instructions, which when executed by the processor, cause the processor to:

obtain information representing a history of arrival times of events, wherein the information comprises arrival timestamps of the events;

determine a measure for power management based on the timestamps of at least two events represented in the information; and take a power management decision based on the determined measure.

According to a fifth aspect, there is provided a computer-program product comprising a computer-readable medium having stored thereon a computer program according to the fourth aspect.

According to a sixth aspect, there is provided an apparatus for power management of an event-based processing system. The apparatus comprises:

a storage module for maintaining information representing a history of arrival times of events, wherein the information comprises arrival timestamps of the events;

a determination module for determining a measure for power management based on the timestamps of at least two events represented in the information; and a decision module for taking a power management decision based on the determined measure.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which:

FIG. 18 is a schematic diagram illustrating an example of how power management decisions for two virtual machines running on the same physical processor can be merged.

FIG. 20A is a schematic block diagram illustrating an example of a system configured for power management of an event-based processing system according to an embodiment.

FIG. 20B is a schematic block diagram illustrating an example of a system configured for power management of an event-based processing system according to another embodiment.

FIG. 20C is a schematic block diagram illustrating an example of a system configured for power management of an event-based processing system according to yet another embodiment.

DETAILED DESCRIPTION

Throughout the drawings, the same reference designations are used for similar or corresponding elements.

Figure 1:
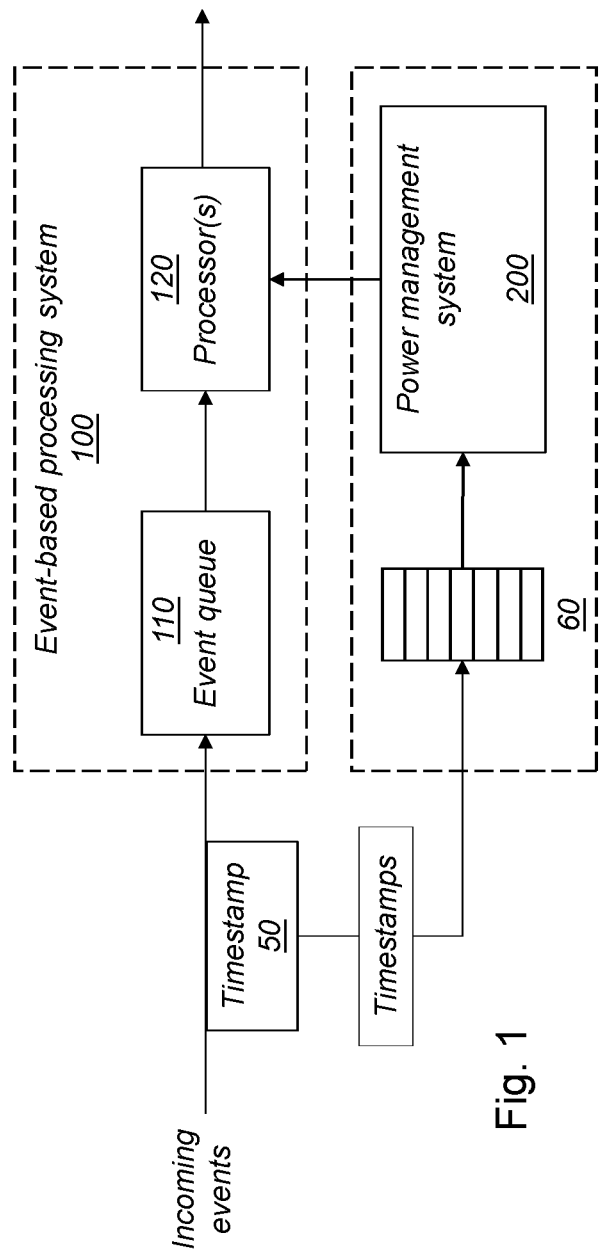
FIG. 1 is a schematic diagram illustrating an example of an event-based processing system and an associated power management system.

FIG. 1 is a schematic diagram illustrating an example of an event-based processing system and an associated power management system. The event-based processing system 100 comprises and event queue 110 and one or more processors 120. The incoming events may be timestamped by a timestamp unit 50 before or when entering the event queue 110. There is also an information structure 210 for keeping information representing a history of arrival times of events, represented by arrival timestamps of the events. The power management system 200 may then be configured to operate based on such information to perform power management by taking appropriate power management actions relevant to the processing system 100. Optionally, the power management system 200 includes the information structure 210, or they are separate entities.

As used herein, the non-limiting term 'processing system' should be interpreted in a general sense as any system or device capable of performing a particular processing, determining or computing task. By way of example, a processing system may include one or more processors and/or processor cores configured for performing various operations and/or tasks. The terms 'processor' and 'core' will be used interchangeably.

As used herein, the non-limiting term 'event' may be defined as the specification of a significant occurrence having a location in time and/or space. In the general context of state machines, an event is an occurrence of a stimulus that can trigger a state transition, i.e. a change in state of the machine. By way of example, an event may be the arrival of a signal message or packet to a processing system. The events may thus be represented by signal messages or packets, and accordingly the event-based processing may involve processing of the messages and/or packets.

In the context of power management, the non-limiting term 'action' may refer to any power management action and/or decision, including changing power states of the processing system but also including a decision to maintain a present power state.

The proposed technology is generally applicable in all technological contexts where an event-based processing system with power management capabilities is involved.

By way of example, the event-based processing system may be a packet processing system arranged in a network environment and the events may be represented by network packets arriving to the processing system.

The proposed technology may thus be implemented in any relevant network device and/or network node in such a network environment.

As used herein, the term "network device" may refer to any device or node located in connection with a communication network, including but not limited to devices and nodes in access networks, core networks and similar network structures. The term network device may also encompass cloud-based network devices.

As used herein, the non-limiting term "network node" may refer to any node in a communication network.

Examples of relevant devices, units and/or nodes in which the proposed technology may be implemented include, but is not limited to, routers, firewalls, servers, access points, base stations, network control nodes such as access controllers, network controllers, radio network controllers, base station controllers, and the like, but also gateways, computers with network interfaces, systems running virtual machines and so forth.

Figure 2:
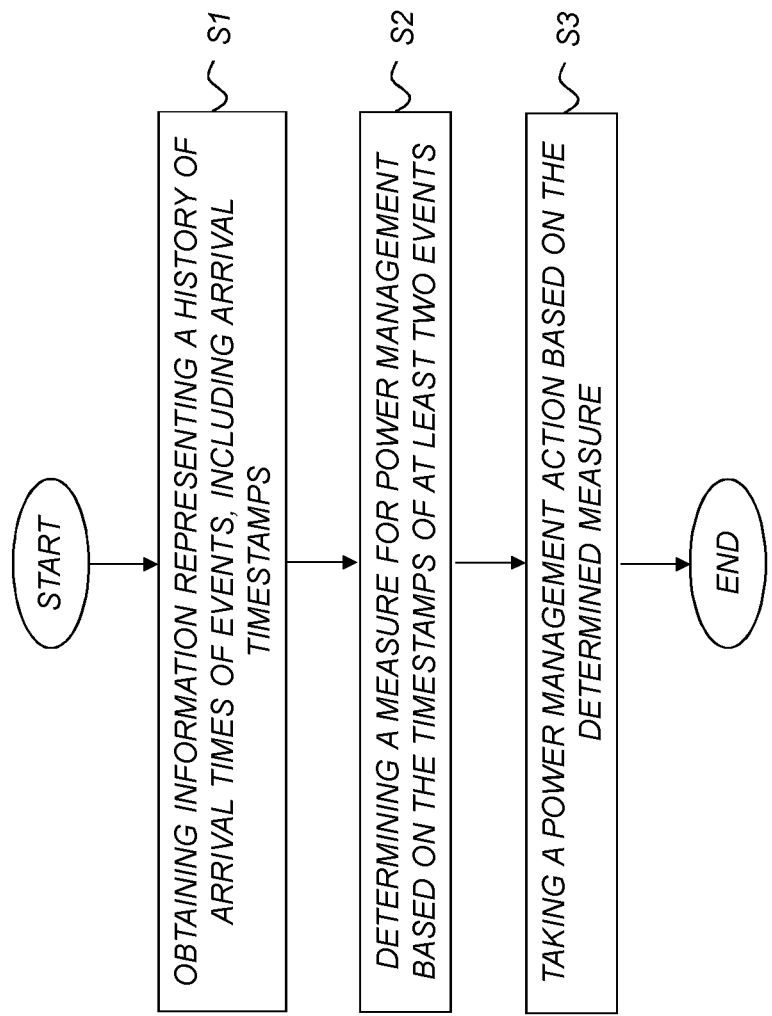
FIG. 2 is a schematic flow diagram illustrating an example of a method for power management of an event-based processing system according to an embodiment.

FIG. 2 is a schematic flow diagram illustrating an example of a method for power management of an event-based processing system.

Basically, the method comprises:

S1: obtaining information representing a history of arrival times of events, wherein the information comprises arrival timestamps of the events;

S2: determining a measure for power management based on the timestamps of at least two events represented in the information; and S3: taking a power management action based on the determined measure.

In this way, highly efficient power management of the event-based processing system is obtained. In particular, the proposed technology enables fast and robust power management decisions, allowing for more aggressive power saving mechanisms without introducing unnecessary delays in the event processing and/or keeping the drop rate low.

In a sense, the event-based processing and the mechanism of keeping a history of arrival times of events are decoupled by i) storing the messages and/or packets representing the events in an event queue 110 where they are awaiting processing by the processing system and ii) storing the arrival timestamps of the events in a separate list or similar information structure 210 for use by the power management system for taking appropriate actions and/or decisions. This allows any event represented in the history of event arrival times to be processed independently of having its timestamp stored in a separate list or similar information structure of event arrival timestamps, thus avoiding additional queue build-up.

Fast and reliable power management decisions can be taken by monitoring the incoming event flow in the time-domain with respect to arrival timestamps rather than in the frequency-domain (e.g. arrival rate or queue length). By way of example, bursts of events can be reliably "detected" early on to allow for direct and appropriate power management decisions to be taken. For example, it may be possible to allow the processing system to go into deeper sleep or power saving modes provided that bursts can be "detected" quickly to enable the power management system to "power up" the processing system in a quick and reliable manner. In short, with a fast response to event bursts, it is possible to go into deeper power saving modes.

Figure 3:
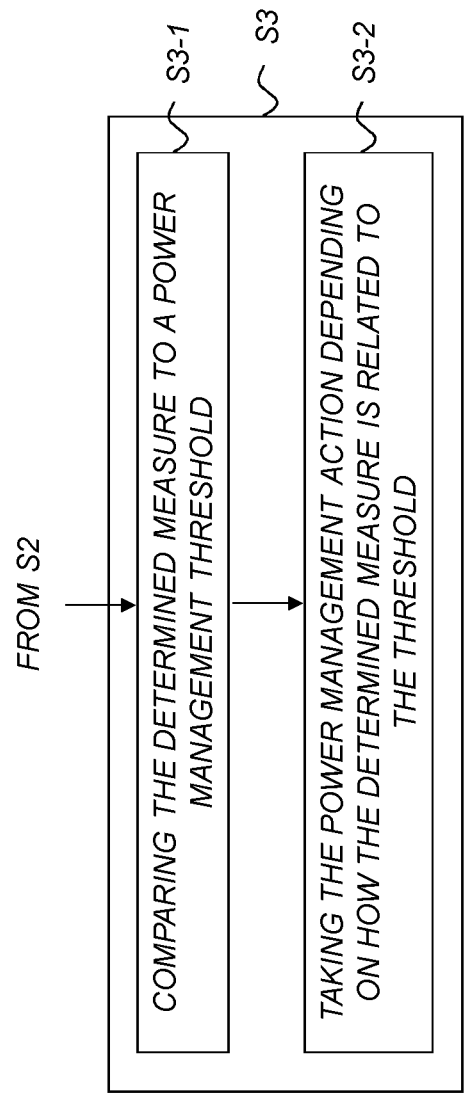
FIG. 3 is a schematic flow diagram illustrating an example of the step of taking a power management action according to an embodiment.

FIG. 3 is a schematic flow diagram illustrating an example of the step of taking a power management action according to an embodiment. In this particular example, the step S3 of taking a power management action comprises:
S3-1: comparing the determined measure for power management to a power management threshold; and
S3-2: taking the power management action depending on how the determined measure is related to the power management threshold.

Figure 4:
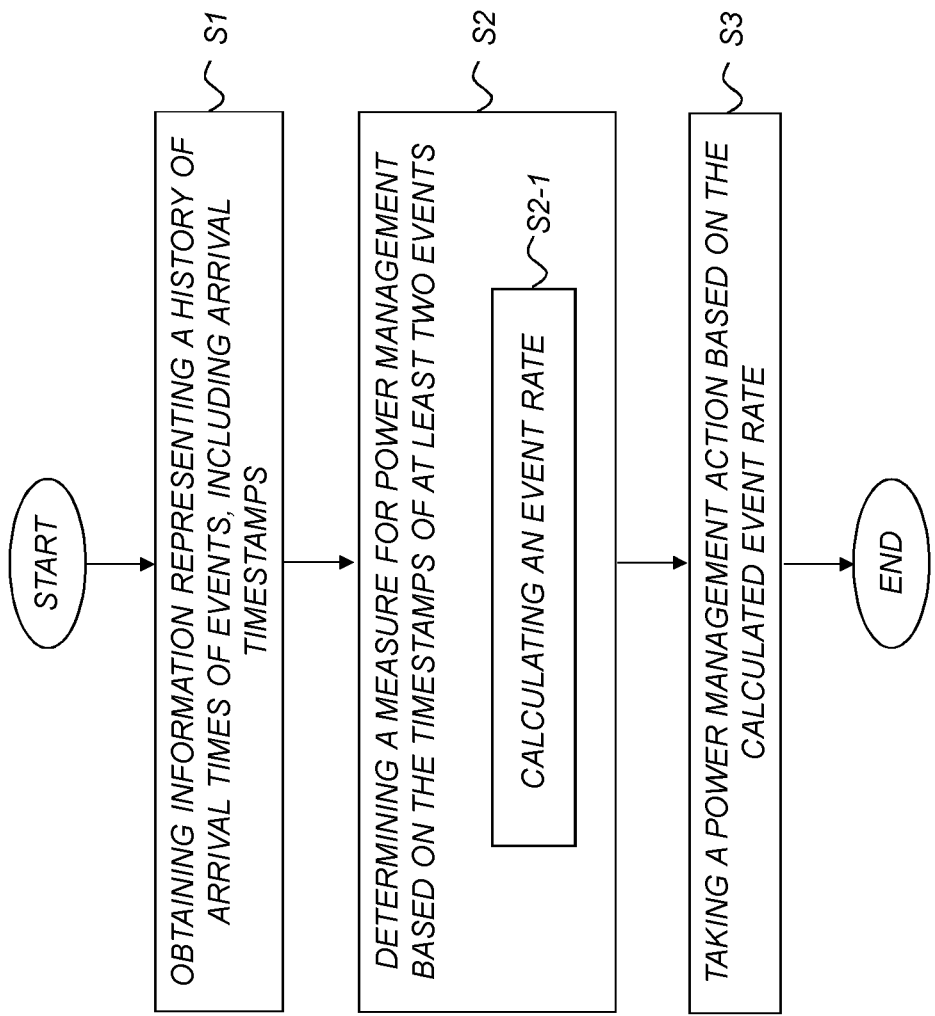
FIG. 4 is a schematic flow diagram illustrating another example of a method for power management of an event-based processing system according to an embodiment.

FIG. 4 is a schematic flow diagram illustrating another example of a method for power management of an event-based processing system according to an embodiment. In this particular example, the step S2 of determining a measure for power management comprises calculating S2-1 an event rate at least partly based on the timestamps of at least two events represented in the information, and the step S3 of taking a power management action is based on the calculated event rate.

Figure 5:
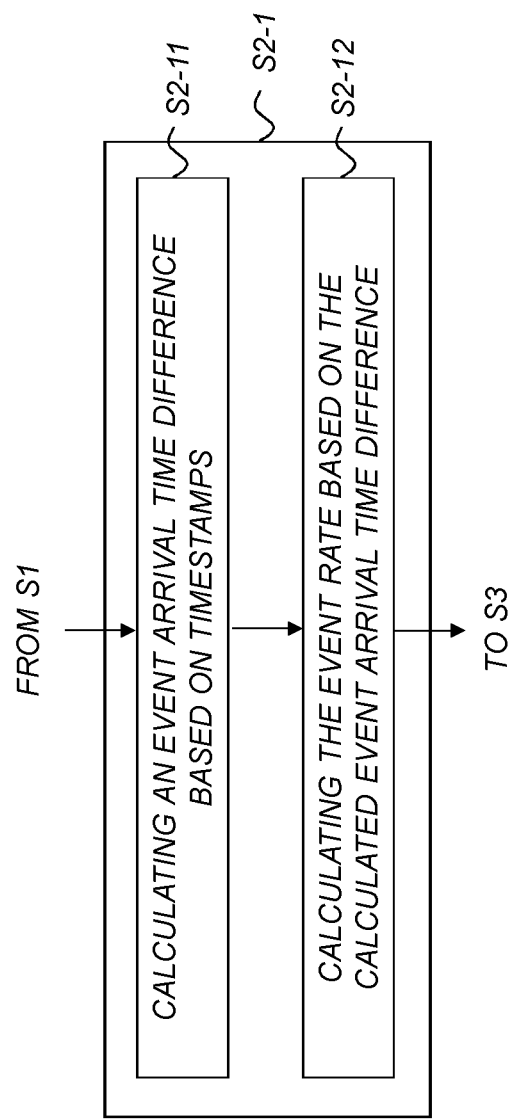
FIG. 5 is a schematic flow diagram illustrating an example of the step of determining a measure for power management according to an embodiment.

FIG. 5 is a schematic flow diagram illustrating an example of the step of determining a measure for power management according to an embodiment. In this example, the step of calculating S2-1 an event rate comprises calculating S2-11 an event arrival time difference based on the timestamps of at least two events represented in the information and calculating S2-12 the event rate based on the calculated event arrival time difference.

Figure 6:
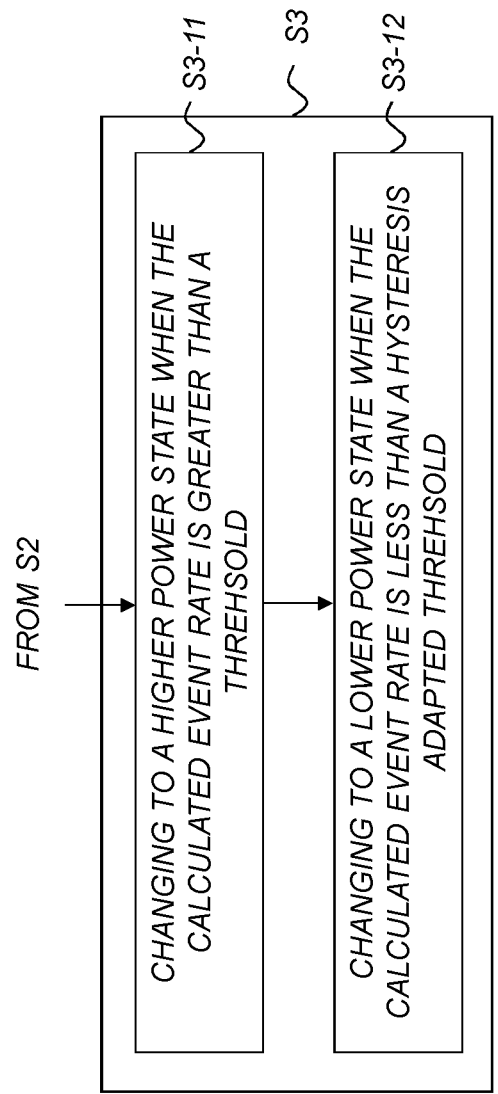
FIG. 6 is a schematic flow diagram illustrating another example of the step of taking a power management action according to an embodiment.

FIG. 6 is a schematic flow diagram illustrating another example of the step of taking a power management action according to an embodiment. In this particular example, the step S3 of taking a power management action comprises changing S3-11 to a higher power state when the calculated event rate is greater than an event rate threshold, and/or changing S3-12 to a lower power state when the calculated event rate is less than a hysteresis adapted threshold, which is defined as the event rate threshold minus a configurable hysteresis level.

Figure 7:
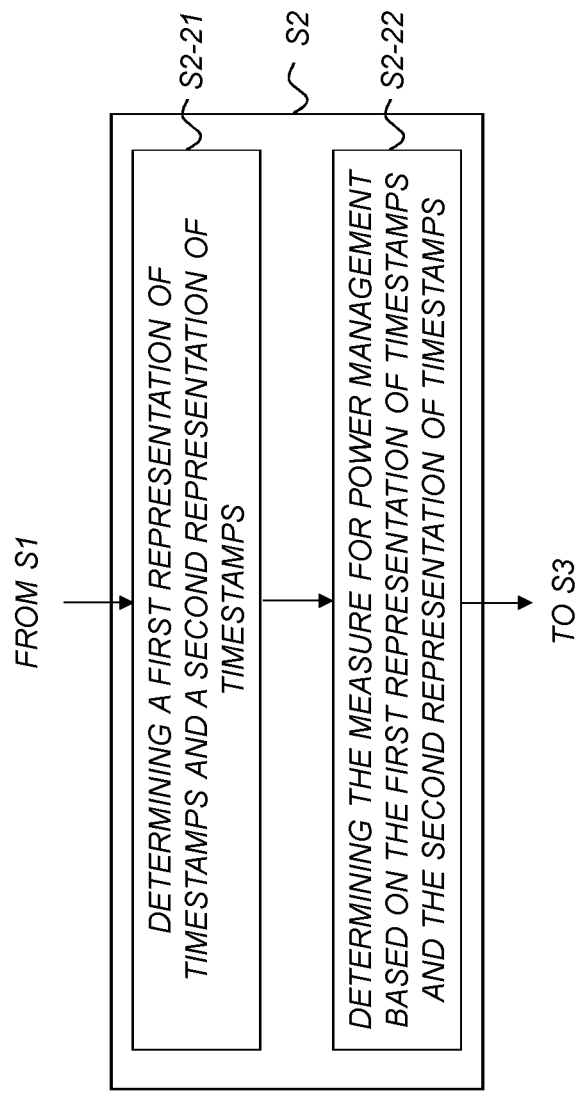
FIG. 7 is a schematic flow diagram illustrating another example of the step of determining a measure for power management according to an embodiment.

FIG. 7 is a schematic flow diagram illustrating another example of the step of determining a measure for power management according to an embodiment. In this example, the step S2 of determining a measure for power management comprises:
S2-21: determining a first representation of timestamps associated with a first set of events and a second representation of timestamps associated with a second set of events; and
S2-22: determining the measure for power management based on the first representation of timestamps and the second representation of timestamps.

By way of example, the information representing a history of arrival times of events may be stored in a circular buffer comprising timestamps of K previously arrived events, and the measure for power management may be determined based on the timestamp of one of the most recently arrived events and the timestamp located N events back in the buffer, wherein N≤K.

For example, the measure for power management may thus be determined based on time stamps that are separated by a number of events, i.e. non-consecutive time stamps.

The process step of determining a measure for power management may be event-triggered. In other words, the measure may be determined and/or updated in response to an event (e.g. at interrupt or polling). By way of example, the measure may be updated every event or every Xth event.

Figure 8:
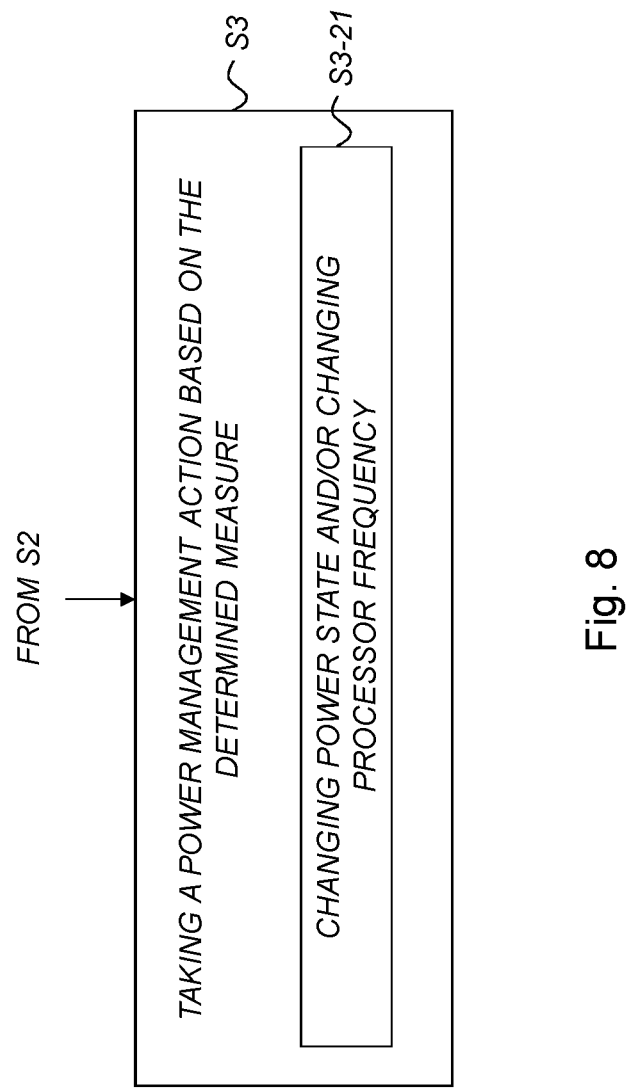
FIG. 8 is a schematic flow diagram illustrating yet another example of the step of taking a power management action according to an embodiment.

FIG. 8 is a schematic flow diagram illustrating yet another example of the step of taking a power management action according to an embodiment. In this particular example, the step S3 of taking a power management action comprises changing S3-21 power state in the processing system and/or changing processor frequency.

For example, the step S3-21 of changing power state comprises changing P state, C state and/or S state of the processing system.

P states normally refers to power states associated with the processor frequency (related through dynamic voltage frequency scaling).

C states normally refers to power states associated with the power-down modes of the core.

S states normally refers to power states associated with the overall system, so-called system states and may include, e.g. the traditional 'Hibernate' state of a computer system.

Optionally, the information representing a history of arrival times of events may be maintained as a continuously updated list 210 of event arrival timestamps.

As previously indicated, the events may for example be represented by signal messages or packets.

As an example, the events are represented by packets arriving to the processing system 100 and the event arrival timestamps are packet arrival timestamps, and a measure for power management is determined based on the packet arrival timestamps of at least two packets.

In a particular example, the processing system 100 is a packet processing system arranged in a network environment and the events are represented by network packets arriving to the processing system.

As will be exemplified later on, the processing system 100 may be a cascaded processing system comprising at least two processors 120 connected in series, wherein the method is performed for each of the processors.

Optionally, the processing system 100 may operate based on two or more virtual machines 130, wherein the method is performed for each of the virtual machines.

The concept of Virtual Machines, VM, and the application of the proposed technology in such a context will be described in more detail later on.

Figure 9:
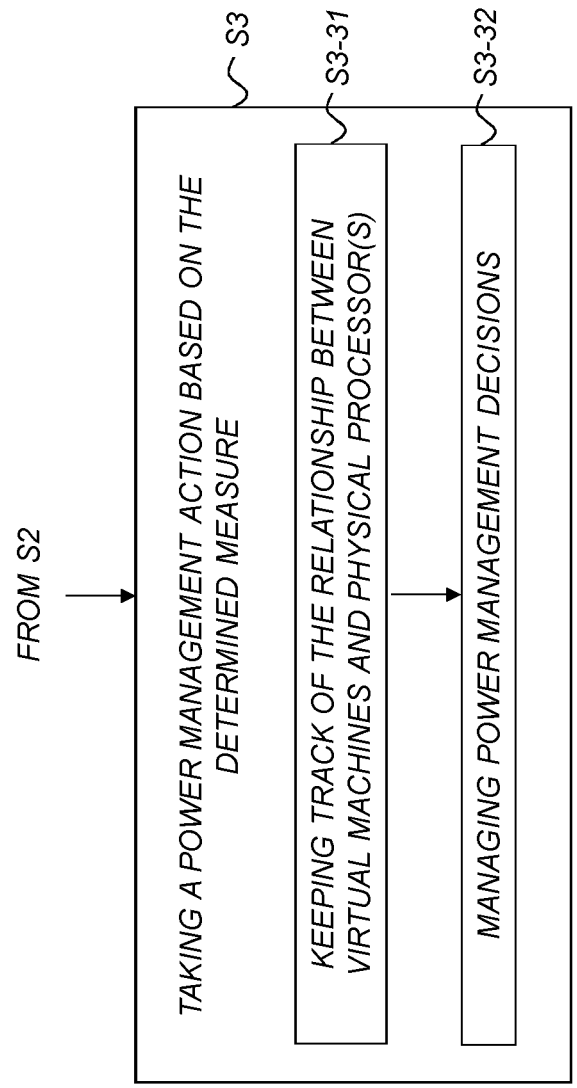
FIG. 9 is a schematic flow diagram illustrating still another example of the step of taking a power management action according to an embodiment.

FIG. 9 is a schematic flow diagram illustrating still another example of the step of taking a power management action according to an embodiment. In this particular example, the step S3 of taking a power management action comprises:
S3-31: keeping track of the relationship between virtual machines and physical processor(s) 120; and
S3-32: managing power management decisions for each of the virtual machines.

Figure 10:
FIG. 10 is a schematic flow diagram illustrating an example of the step of managing power management decisions according to an embodiment.

FIG. 10 is a schematic flow diagram illustrating an example of the step of managing power management decisions according to an embodiment. In this example, the step S3-32 of managing the power management decisions for each of the virtual machines comprises merging S3-33 the power management decisions for two or more virtual machines running on the same physical processor 120.

By way of example, the step S3-33 of merging the power management decisions for two or more virtual machines running on the same physical processor may involve setting an intermediate power state based on a request for a lower power state from one of the virtual machines and a request for a higher power state from another one of the virtual machines.

Optionally, a probing mechanism may be performed to provide an estimate for determining at least one power management threshold, wherein the step S3 of taking a power management action is based on the power management threshold(s).

For a better understanding, the proposed technology will now be described with reference to a number of non-limiting examples including a series of examples of processing systems adapted for packet processing in a network environment.

Fast and reliable burst detection is essential for building aggressive power saving mechanisms. If queues are allowed to build up, then there is also a risk for packet drops. This can normally be mitigated in two ways, either the power saving function is disabled or it is set to scale down power very slowly, keeping the high capacity and high power state for a longer time.

The drop rate is a Key Performance Indicator, KPI, which is normally monitored. If the drop rate is not very low then the power saving might be disabled, even if the drops occur only occasionally at specific traffic cases.

The method allows for working with absolute packet rate, fully independent of implementation details like speed of poll loop and so forth. Specifically, it can freely be combined with other power saving modes in the poll loop (i.e. microsleep or push-mode solutions). This improves code portability and software can be the same for different hardware solutions.

Figure 11:
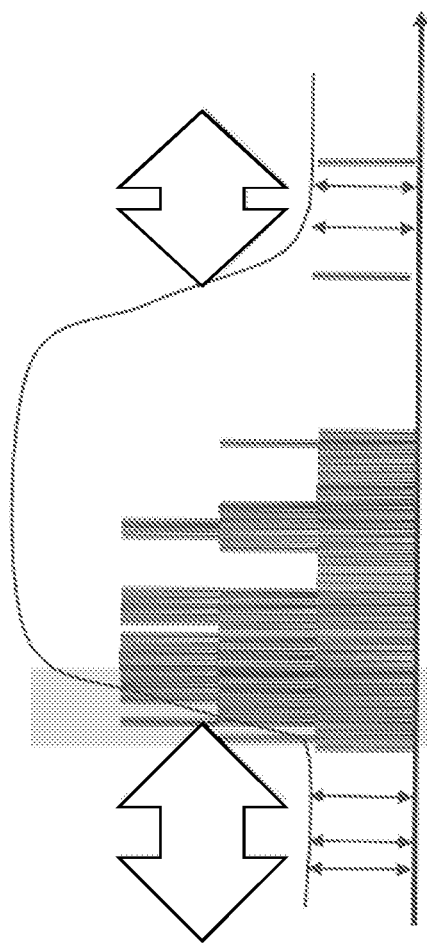
FIG. 11 is a schematic diagram illustrating an example of a burst of incoming packets and the importance of keeping a headroom in capacity.

The internet traffic is both unpredictable and bursty. Since the proposed solution allows for working with absolute packet rates it also allows for keeping track of absolute performance needs and keeping a headroom in capacity. Keeping a headroom allows for power saving without introducing either packet delays or packet drops (see FIG. 11).

Another advantage is that the mechanism tracks only one type of data for a specific limited number of packets, giving a small data structure. This is needed since a high performance SW network stack should be designed for residing fully in cache memory.

The mechanism works on packets in flight and not with packets in queues (e.g. the receive queue). Any mechanism working with receive queue, either by high/low watermarks of number of packets in the queue or by tracking and detecting changes of queue length also depend on a queue build-up i.e. packets being delayed. The proposed solution is specifically designed for detecting high load and specifically bursts without packets first being delayed. Specifically, it is possible to detect bursts with zero queueing delay.

Some existing work with average packet rates exist, i.e. average number of arrived packets in a predefined timer interval, based on a periodic timer. There are multiple problems with this approach:
1) Fast response also requires high resolution, giving a high overhead. Typically, fairly long time periods are used avoid this. Implementing short interval would drive power consumption also at low traffic when we want to save power.
2) In addition to this, bursts are not aligned to intervals, which makes burst detection less reliable. At a certain thresholds level, a burst can be detected or not depending if falls within an interval or not.

This mechanism instead work with the inverse, by analyzing time between available high-resolution timestamps, then precision comes without any extra overhead.

The proposed technology can work either as the only power management control mechanism or as complement to existing power management mechanism for improving speed and reliability in burst detection.

Individual internet traffic flows are both unpredictable and bursty. It has also been shown that the combined aggregated traffic streams from many users keeps these properties.

For these reasons it is desirable to design power saving mechanisms that are:
1. Very responsive by detecting bursts fast and reliably, and/or
2. Quickly giving high performance when the burst is detected.

Without a fast and reliable mechanism, the only way to keep low drop rates is to instead keep capacity on-line all the time for being able to handle bursts if they appear.

A first insight is that the better we are at detecting bursts (faster and, specifically, more reliable) then the more aggressive we can be on power saving.

A second insight is that existing methods base the burst detection based on the receive queue, either by high/low watermarks or by tracking queue length over time for detecting changes (i.e. referred to as "trends" in the reference), which means that no bursts can be detected and no power management actions can be made before packets are already delayed.

For detecting bursts and traffic changes before packets being delayed then the burst detection must explicitly keep history for packets that already received and that are passed into packet processing pipeline.

Also, a third insight is that most power management mechanisms try to target balancing the available capacity to the current need (integrated over some time), to keep a "just enough" amount of capacity to save power. However, the unpredictable nature of internet traffic means that there is no concept as "current need".

If traffic patterns are really unpredictable, the only way to adjust capacity to be "just enough" is to first delay packets to see much capacity is needed. Instead, regulation must be based on how large bursts that are reasonable to handle without causing delays. To do this, it is advantageous to have a mechanism that work on absolute packet rates (packets per second) and not relative capacity measurements (e.g. to low since queue is increasing).

For doing this, it is beneficial to work with actual timing information and the history is based on packet timestamps.

Figure 12:
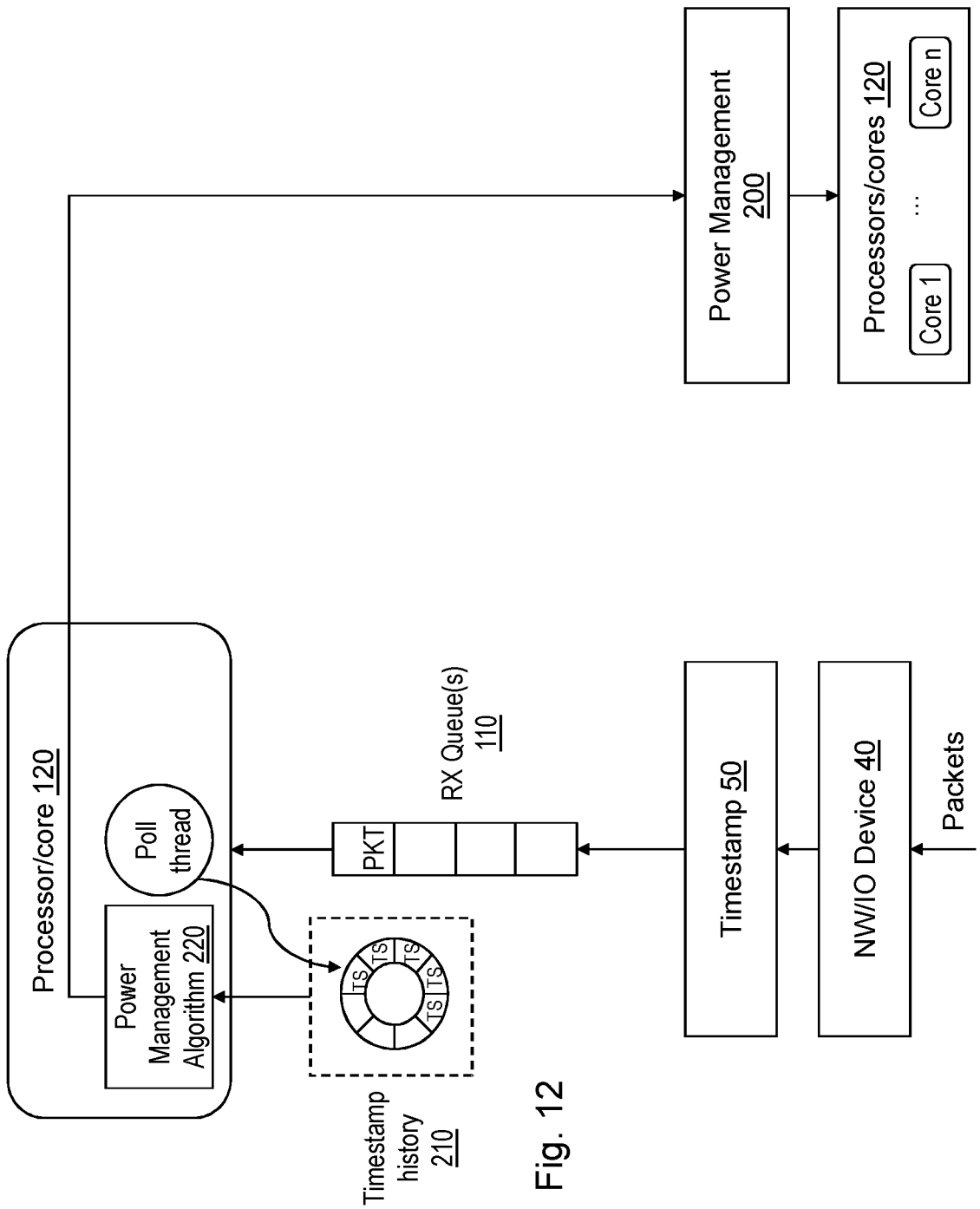
FIG. 12 is a schematic block diagram illustrating an example of a processing system and an associated power management system.

FIG. 12 is a schematic block diagram illustrating an example of a processing system and an associated power management system.

In a particular, non-limiting example with reference to packet processing, the following procedure may be followed:
(1) All incoming received packets are automatically time-stamped by hardware 50 in connection with a network, NW/IO, device 40 at the network interface.

The exact rate and format of the timestamp is not important. However, it should have high enough resolution relative the arrival of packets. Preferably, resolution should be better than minimal time between packets. Also, the timestamp clock should be constant and not change depending on, for example, processor frequency scaling.

(2) There is an explicit history of timestamps.

The networking SW keeps a history of the last timestamps. This is typically organized as circular buffer or list 210. The size of the buffer does not have to be longer than the allowed queue buildup until burst detection. If we want to be able to detect a burst within K packets, such as 128 packets, then the history does not have to be more than 128 timestamps.

(3) When the poll loop detects an arrived packet the loop:
   a. Copies the timestamp from the arrived packet to the head of the list and increments the head pointer.
   b. Reads the time stamp from N packets back in the list
   c. Compares the two timestamps to calculate the time in-between packets
   d. The packet rate is calculated based on the time in-between packets.
(4) The power management algorithm 220 is called with packet rate as input.
(5) When the power management algorithm 220 is executed then it may perform the following example procedure:
   a. Determine if the load is high or low by comparing the packet rate with a predefined threshold. The threshold should be set based on the polling cores capacity either manually or automatically by some form of probing. (see FIG. 13)
   b. Use a hysteresis to avoid oscillation between the high and low power states. (see FIG. 13)
   c. If the power state has changed, call the power management functions 200 in the OS to set the new power state of one or more of the processor(s)/core(s) 120.
(6) Concurrently, packets from the RX queue(s) 110 are successively processed by the processor(s)/core(s) 120 of the processing system.

A variation is to do multiple checks, not only check N timestamps back but also a larger M timestamps back.

Another variation is to save and check only every Xth of the time stamps. This would trade a bit of speed in detection (up to X packets) for an X times smaller data structure.

In a particular example, the power management algorithm can be combined and/or integrated with management and/or control of P states, C states and/or S states:

1) For handling traffic without delay there must always be enough headroom capacity enabled.
2) For longer periods of low traffic it is beneficial to save more power by going into higher C-state (disabling cores) or P-state (lowering clock frequency on cores). These mechanisms have some delays and it is desirable to minimize effects on the packet traffic. In general, the mechanisms with better saving has longer wake-up delay.
3) There are many different C-states with different saving and wake-up delays e.g. C1-C6, where C1 denotes shortest delay and smallest power saving and C6 includes largest saving by saving the internal state, fully powering down the core and a corresponding longer wake-up by powering up the core and then reading back the internal state.
4) The wake-up time includes: a) burst detection response, b) call to the system SW to wake-up the core and c) the core wake-up time itself.
5) Relations are as follows:
   Within a given time budget, a faster burst detection response makes it possible to allow for longer core wake-up, enabling using deeper sleep modes. For a given method, a faster burst detection response makes it possible to have a smaller headroom with lower amount of resources standby, enabling lower power.
6) P-states (also called Speed-Step) implemented by Dynamic Voltage Frequency Scaling, DVFS, work quite similar, where the change time includes: a) burst detection response, b) call system SW to initiate the change, and c) the change time itself. Execution is stopped during part of the system SW time and the change time.
7) Relations are as follows: A faster burst detection response allows for keeping a lower headroom and enabling lower power.

New and future processors will implement a much faster P-state change and prior art burst detection algorithms may then be the dominating time factor in the power management procedures.

A slow burst detection also gives a larger build-up of queued events waiting to be processed—a fast and reliable burst detection allows for lower power at low traffic but also lower power when ramping up since there is less need for over-capacity for processing the queue of arrived, unprocessed events.

In general, P-state changes are both faster and much less complex form a SW, system and verification perspective, but cannot reach the lowest power levels.

The actual power management operations are normally not predictable in time and it is advisable to handle them separately from the packet processing, i.e. outside the so-called packet processing fast path. Locating these parts on a different core makes it is possible to minimize the impact on the cores dedicated to the packet fast path. Also, this allows these parts of the software to be less optimized, or even leveraging the already existing functionality in the operating system.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided a system configured for power management of an event-based processing system. The system is configured to obtain information representing a history of arrival times of events, wherein the information comprises arrival time-stamps of the events. The system is configured to determine a measure for power management based on the timestamps of at least two events represented in the information. The system is further configured to perform power management based on the determined measure.

As previously described, FIG. 12 is a schematic block diagram illustrating an example of a processing system and an associated power management system.

Figure 13:
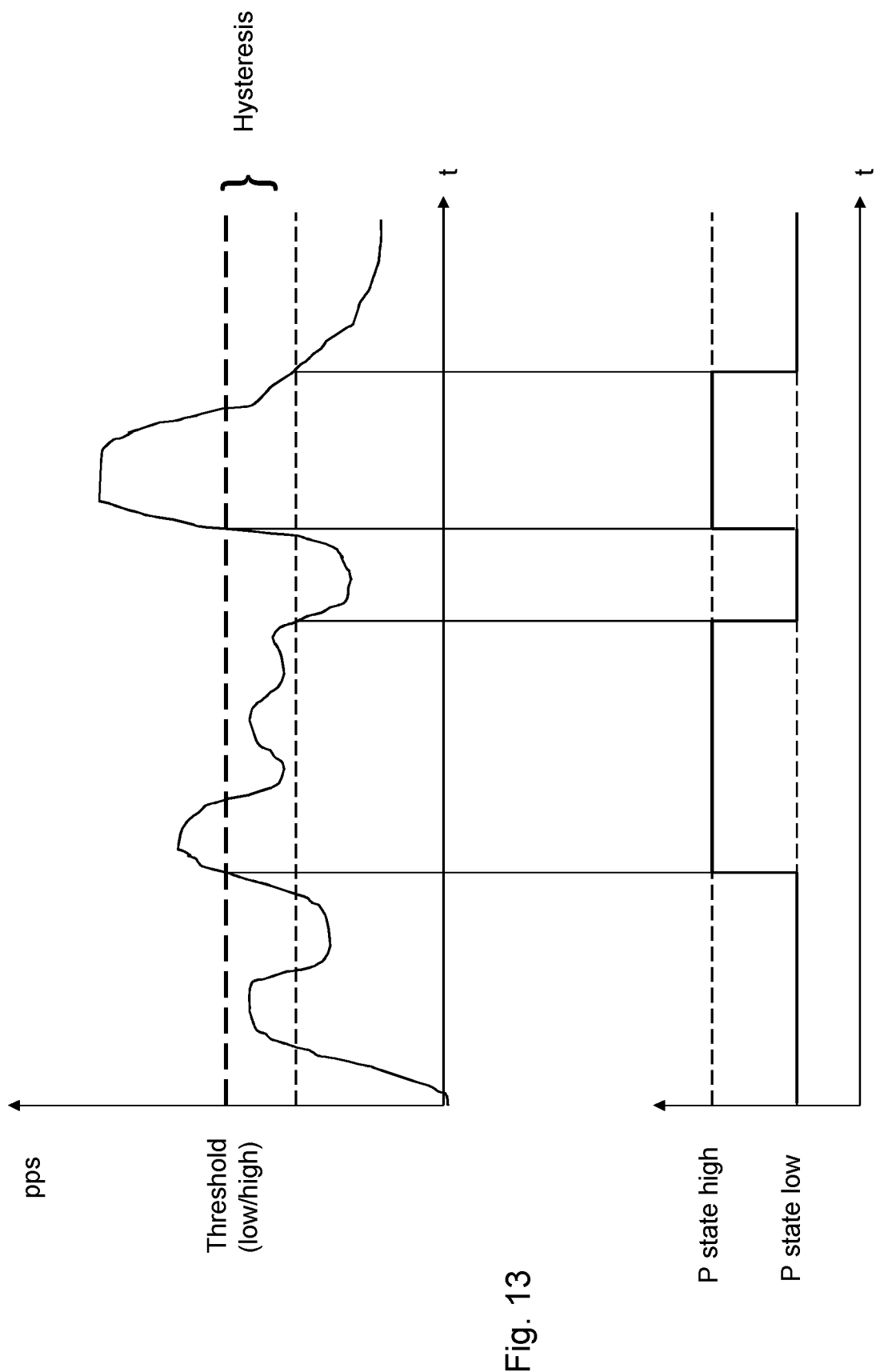
FIG. 13 is a schematic diagram illustrating an example of the operating principles of a power management system according to an embodiment.

FIG. 13 is a schematic diagram illustrating an example of the operating principles of a power management system according to an embodiment.

By way of example, the system may be configured to perform power management based on comparing the determined measure for power management to a power management threshold and taking a power management action depending on how the determined measure is related to the power management threshold.

For example, the system may be configured to determine a measure for power management by calculating an event rate at least partly based on the timestamps of at least two events represented in the information, and the system may be configured to take a power management decision based on the calculated event rate.

In a particular example, the system is configured to calculate the event rate by calculating an event arrival time difference based on the timestamps of at least two events represented in the information and calculating the event rate based on the calculated event arrival time difference.

As an example, the system may be configured to change to a higher power state when the calculated event rate is greater than an event rate threshold, and/or change to a lower power state when the calculated event rate is less than a hysteresis adapted threshold, which is defined as the event rate threshold minus a configurable hysteresis level (see FIG. 13).

By way of example, the system may be configured to perform power management by changing power state in the processing system and/or changing processor frequency.

For example, the system may be configured to change P state, C state and/or S state of the processing system.

Optionally, the system is configured to maintain the information representing a history of arrival times of events as a continuously updated list of event arrival timestamps.

As previously indicated, the system may for example be configured to operate based on events represented by signal messages or packets.

In a particular example, the system is configured to operate based on events represented by packets arriving to the processing system and the event arrival timestamps are packet arrival timestamps, and the system is configured to determine a measure for power management based on the packet arrival timestamps of at least two packets.

For example, the processing system may be a packet processing system arranged in a network environment and the events may be represented by network packets arriving to the processing system.

As previously shown, the processing system may even be a cascaded processing system comprising at least two processors connected in series, and the power management system is configured to perform power management for each of the processors.

Optionally, the processing system operates based on at least two virtual machines, and the power management system is configured to perform power management for each of the virtual machines.

For example, the system may be configured to keep track of the relationship between virtual machines and physical processor(s) and manage the power management decisions for each of the virtual machines.

As an example, the system may be configured to merge the power management decisions for two or more virtual machines running on the same physical processor.

In a particular example, the system is configured to merge the power management decisions for two or more virtual machines running on the same physical processor by setting an intermediate power state based on a request for a lower power state from one of the virtual machines and a request for a higher power state from another one of the virtual machines.

Optionally, the system is configured to perform a probing mechanism to provide an estimate for determining at least one power management threshold, and to perform power management based on said at least one power management threshold. As an example, the probe can be implemented as a simple active probe i.e. send a number of events through the fast path and measure the average execution time.

Figure 14:
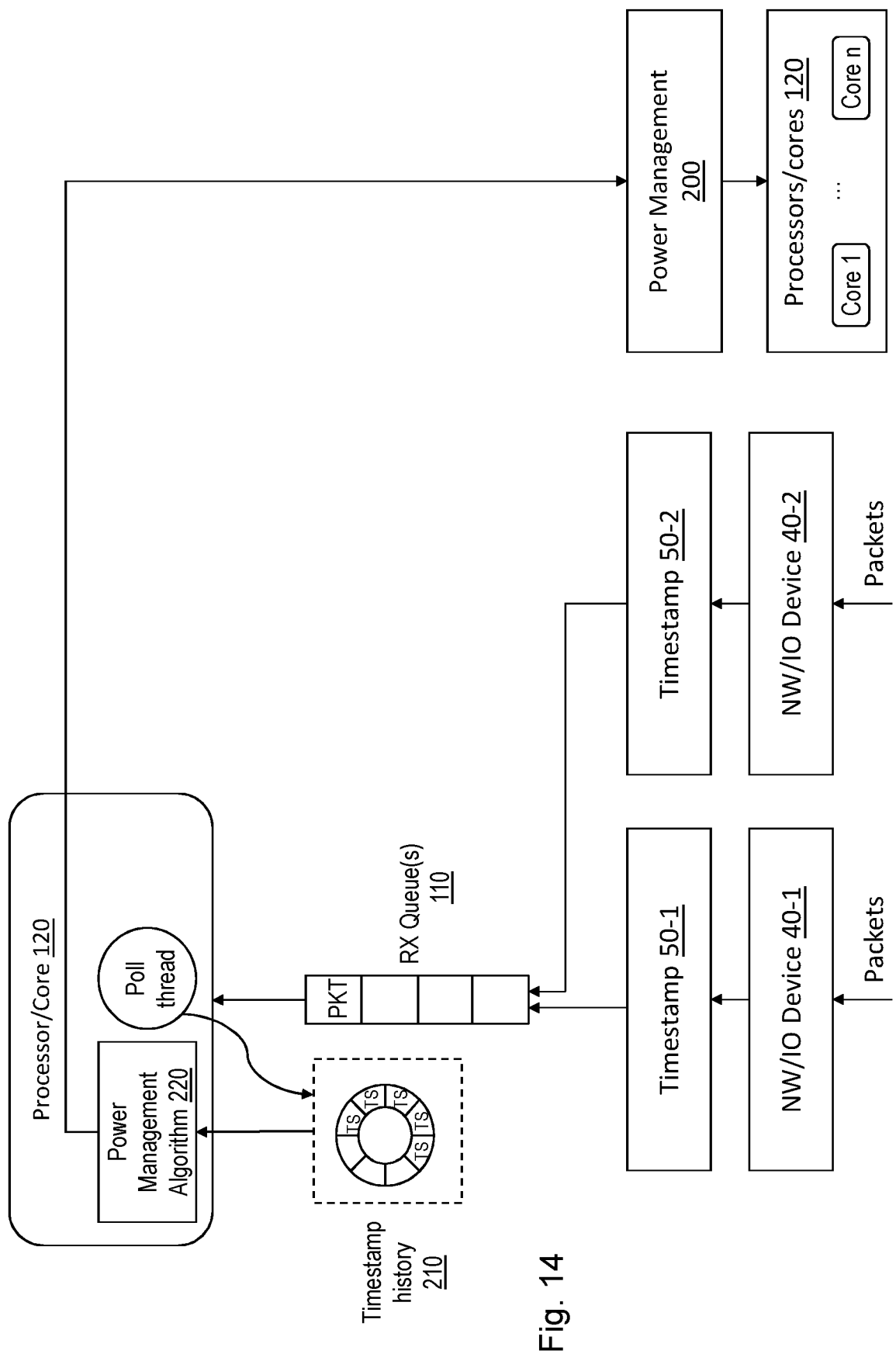
FIG. 14 is a schematic block diagram illustrating an example of a processing system and an associated power management system, where the processing system is connected for receiving packets from multiple network devices.

FIG. 14 is a schematic block diagram illustrating an example of a processing system and an associated power management system, where the processing system is connected for receiving packets from multiple network devices 40-1 and 40-2. It is also possible to have multiple RX queues 110.

It is further possible to extend the solution to regulate the power of processors/cores in a processing pipeline, also referred to as a cascaded processing system.

Figure 15:
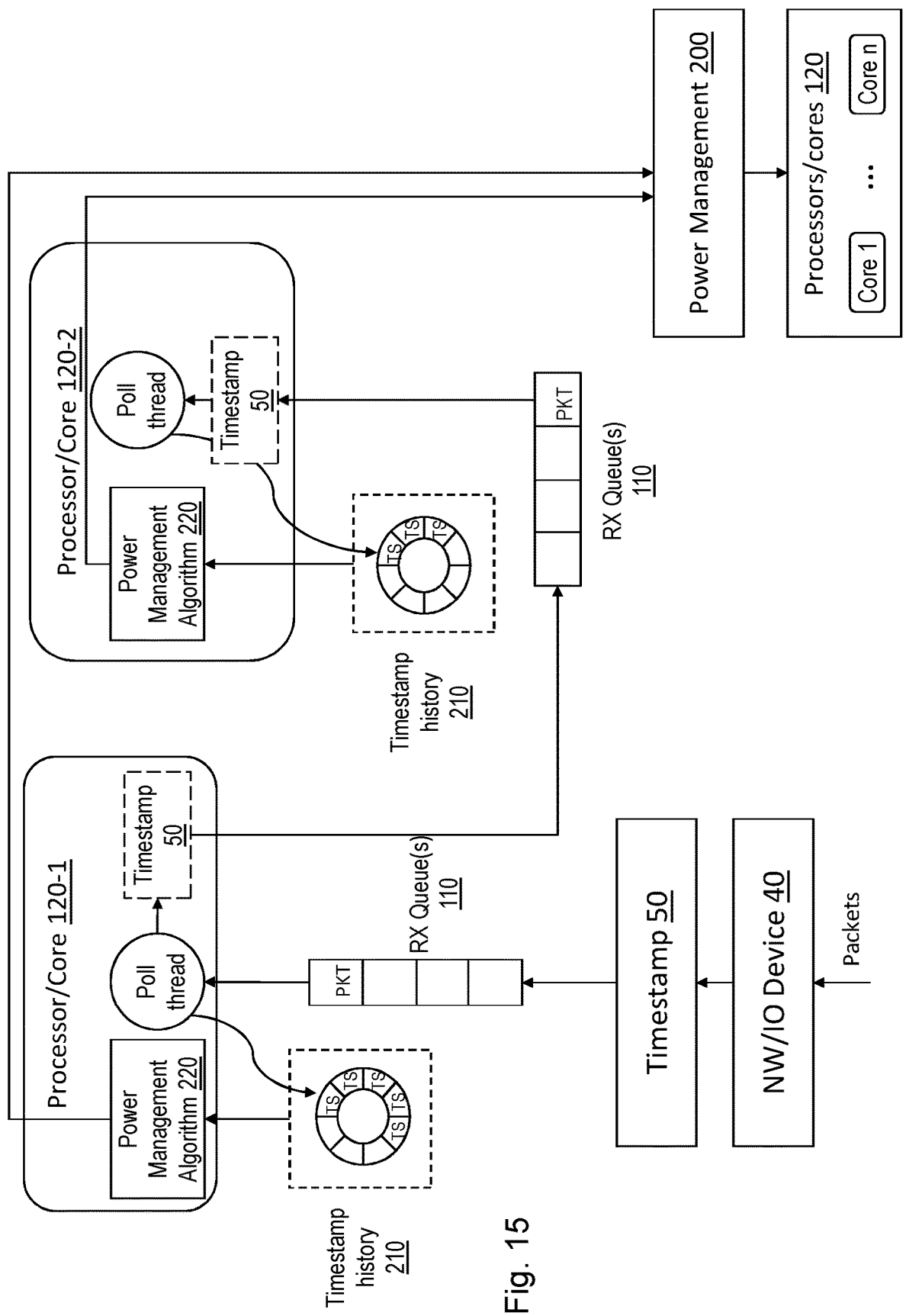
FIG. 15 is a schematic block diagram illustrating an example of a cascaded processing system comprising at least two processors connected in series, where the power management system is configured to perform power management for each of the processors.

FIG. 15 is a schematic block diagram illustrating an example of a cascaded processing system comprising at least two processors 120-1 and 120-2 connected in series, where the power management system 200; 220 is configured to perform power management for each of the processors. Each core that sends packets or signal/messages to another core should timestamp the packets. By way of example, this can be performed by a timestamp unit 50 in the core 120-1 sending the packets. Alternatively, the timestamping may be performed by a timestamp unit 50 in the core 120-2 receiving the packets.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

A network device may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a set of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes.

Another such alternative embodiment implements full virtualization, in which case: 1) the virtualization layer represents a hypervisor, sometimes referred to as a Virtual Machine Monitor (VMM), or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

A NFV cloud implementation may perform chaining of Virtual Network Functions, VNF, e.g. virtual routers, virtual firewalls and so forth. The VNF chaining can be implemented either within one processor or between processors. The proposed technology is relevant in both these cases. When crossing to a new processor, or a new power domain, then this processor and/or domain might have other power characteristics and an additional power control should preferably be effectuated.

Figure 16:
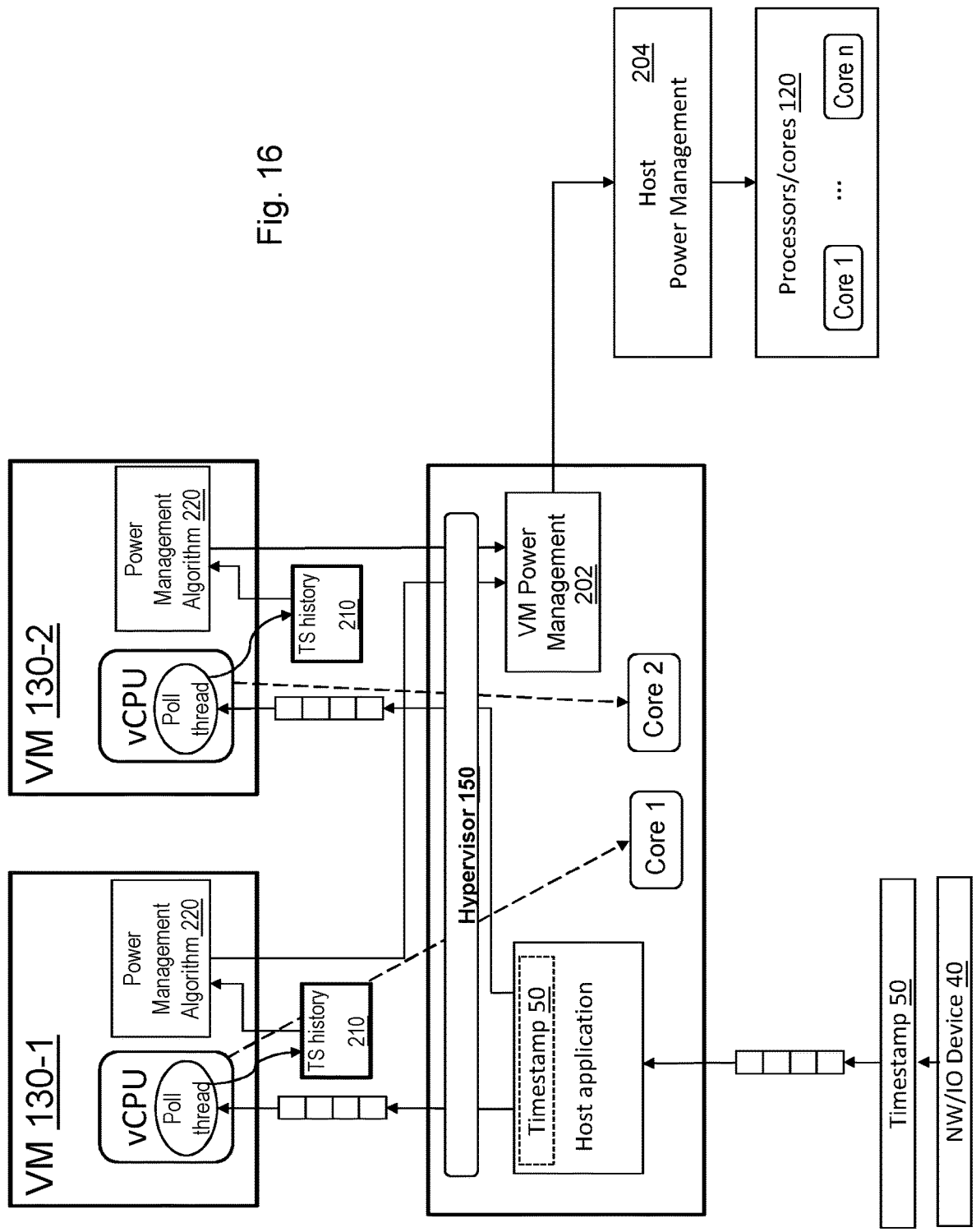
FIG. 16 is a schematic block diagram illustrating an example of a processing system operating based on at least two virtual machines, where the power management system is configured to perform power management for each of the virtual machines.

FIG. 16 is a schematic block diagram illustrating an example of a processing system operating based on at least two virtual machines.

The processing system comprises at least two Virtual Machines, VM, 130-1 and 130-2 running on one or more processor cores 120, and are controlled and/or managed by a Hypervisor 150.

With virtual machines, a VM Power Management unit 202 is normally needed. The VM Power Management unit 202 typically keeps track of the relationship between virtual machines and physical processor(s)/core(s) and the requested power states from the applications running in the VMs.

The power management system 200 system is configured to perform power management for each of the virtual machines 130-1 and 130-2, and normally distributed between power management algorithms 220 executed for each virtual machine and the VM Power Management unit 202 and a Host Power Management unit 204.

Packets are received and typically timestamped by a timestamp unit 50 arranged in connection with or integrated with the NW/IO device 40 at the network interface. A new timestamp can be added in the host application or the timestamp from the network interface can be used for packets sent to the VMs 130-1 and 130-2. If new timestamps are added, the calculated rate in the VMs can be slightly more accurate.

The power management algorithm 220 can be used in VMs in the same way as previously described. Feedback can be sent from the VMs to the VM Power management unit 202, e.g. in the form of desired or requested power states. The VM Power Management unit 202 keeps track of the VM-to-processor mapping, also referred to as vCPU-to-CPU mapping. If several VMs are mapped to one processor, more power states than high/low are preferably used, as will be explained below. The VM Power Management unit 202 interfaces with the Host Power Management unit 204, which in turn executes the power management operations on the physical processor(s)/core(s).

Figure 17:
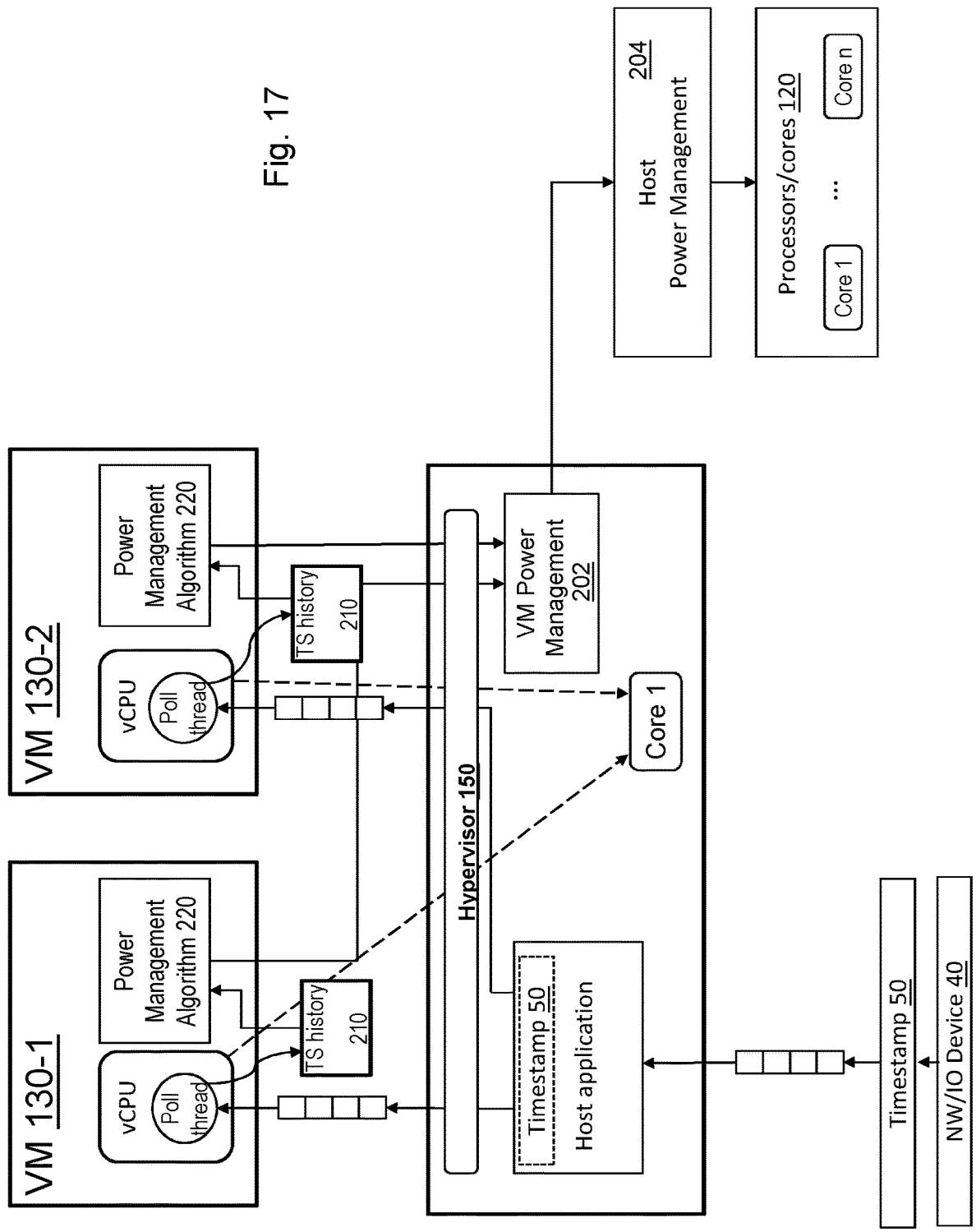
FIG. 17 is a schematic block diagram illustrating an example of a processing system operating based on at least two virtual machines, where at least two virtual machines run on the same physical processor.

FIG. 17 is a schematic block diagram illustrating an example of a processing system operating based on at least two virtual machines, where at least two virtual machines run on the same physical processor/core.

Normally, the VMs in a data plane application are pinned to one or more physical processors or cores. If only one VM is pinned to a physical core (and nothing else is running on the core), the power management algorithm as described earlier can be used as is. However, if several VMs are pinned to one and the same physical core, the algorithm can still be used but it is beneficial to have more than two power states.

By way of example, if for instance two VMs share a physical core, it is advisable to have at least three power states such as Low, Medium, and High. If three VMs share a physical core, it is advisable to have at least four power states such as Low, Medium Low, Medium High, and High.

FIG. 18 is a schematic diagram illustrating an example of how power management decisions for two virtual machines running on the same physical processor can be merged. In this example, two VMs, also referred to as vCPUs, share the total capacity of the physical core, each operating at 25-50% of the capacity.

If the requested power states from vCPU1 and vCPU2 are High (H) and High (H), the requests are merged into a corresponding High (H) power state for the physical CPU, which translates into 100% power operation.

If the requested power states from vCPU1 and vCPU2 are High (H) and Low (L), the requests are merged into a corresponding Medium (M) for the physical CPU, which translates into 75% power operation. Similarly, if the requested power states from vCPU1 and vCPU2 are Low (L) and High (H), the requests are merged into a corresponding Medium (M) for the physical CPU.

If the requested power states from vCPU1 and vCPU2 are Low (L) and Low (L), the requests are merged into a corresponding Low (L) power state for the physical CPU, which translates into 50% power operation.

Figure 19:
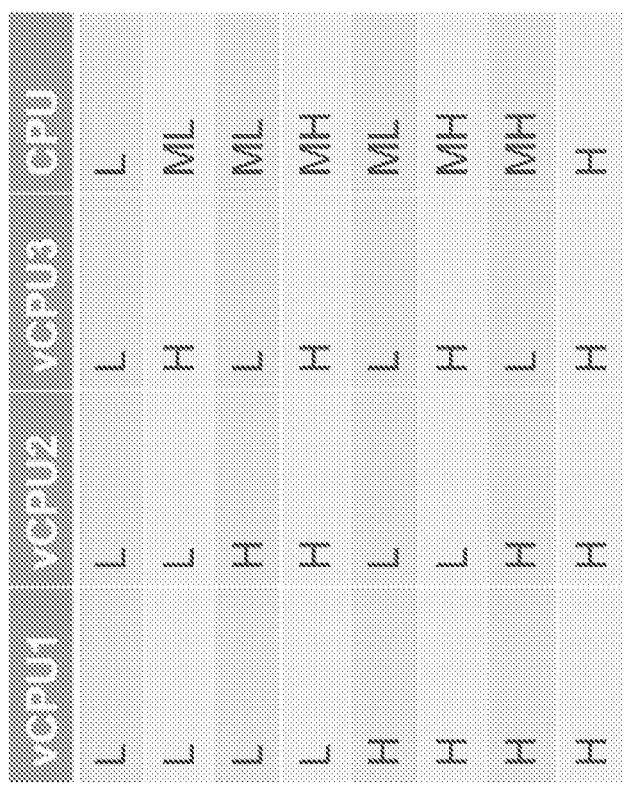
FIG. 19 is a schematic diagram illustrating an example of how power management decisions for three virtual machines running on the same physical processor can be merged.

FIG. 19 is a schematic diagram illustrating an example of how power management decisions for three virtual machines running on the same physical processor can be merged. In this example, three VMs, also referred to as vCPUs, share the total capacity of the physical core, each operating at 16.67-33.33% of the capacity.

The requested power states of the individual VMs, also referred to as vCPUs, are either Low (L) or High (H), and the merged power states of the physical core include Low (L), the intermediate power states Medium Low (ML) and Medium High (MH), and High (H), corresponding to 50%, 67.7%, 83.3% and 100% power, respectively.

FIG. 20A is a schematic block diagram illustrating an example of a system configured for power management of an event-based processing system according to an embodiment. In this particular example, the system 200 comprises a processor 230 and a memory 240, the memory 240 comprising instructions executable by the processor 240, whereby the processor is operative to perform the functions described herein including power management.

Optionally, the system 200 may also include an input/output (I/O) unit 250. The I/O unit 250 may include functions for wired and/or wireless communication with other devices and/or network nodes in the network. In a particular example, the I/O unit 250 may be based on radio circuitry for communication with one or more other nodes, including transmitting and/or receiving information. The I/O unit 250 may be interconnected to the processor 230 and/or memory 240. By way of example, the I/O unit 250 may include any of the following: a receiver, a transmitter, a transceiver, input port(s) and/or output port(s).

FIG. 20B is a schematic block diagram illustrating an example of a system configured for power management of an event-based processing system according to another embodiment. In this example, the system 200 is based on a hardware circuitry implementation. Particular examples of suitable hardware circuitry include one or more suitably configured or possibly reconfigurable electronic circuitry, e.g., Application Specific Integrated Circuits (ASICs), FPGAs, or any other hardware logic such as circuits based on discrete logic gates and/or flip-flops interconnected to perform specialized functions in connection with suitable registers (REG), and/or memory units (MEM).

FIG. 20C is a schematic block diagram illustrating an example of a system configured for power management of an event-based processing system according to yet another embodiment. In this example, the system 200 is based on combination of both processor(s) 230 and hardware circuitry 235 in connection with suitable memory unit(s) 240. The system 200 comprises one or more processors 230, memory 240 including storage for software (SW) and data, and one or more units of hardware circuitry 235. The overall functionality is thus partitioned between programmed software for execution on one or more processors 230 and one or more pre-configured or possibly reconfigurable hardware circuits 235. The actual hardware-software partitioning can be decided by a system designer based on a number of factors including processing speed, cost of implementation and other requirements.

Figure 21:
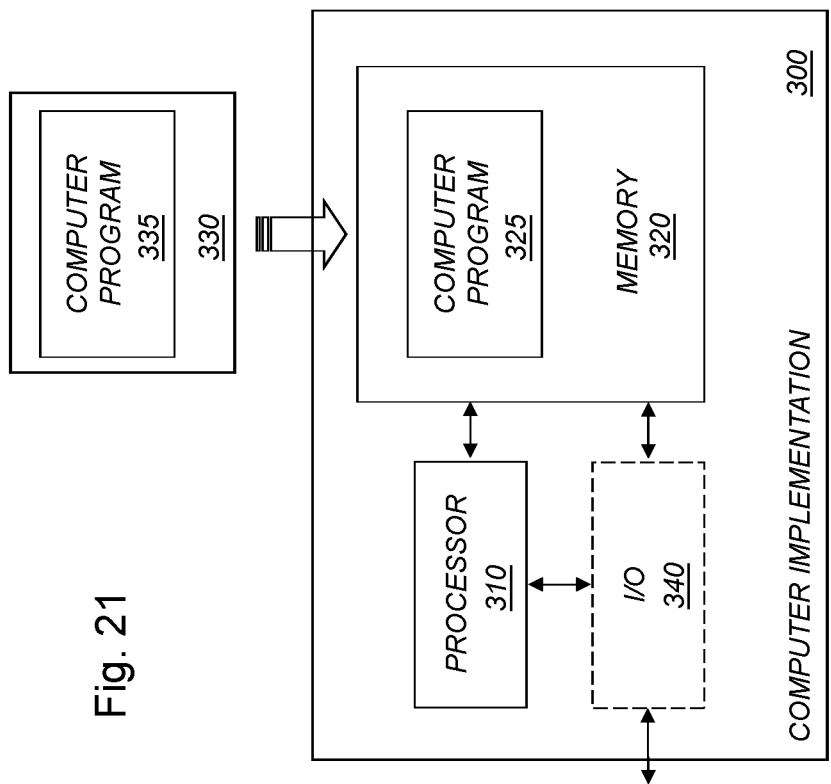
FIG. 21 is a schematic diagram illustrating an example of a computer-implementation according to an embodiment.

FIG. 21 is a schematic diagram illustrating an example of a computer-implementation according to an embodiment. In this particular example, at least some of the steps, functions, procedures, modules and/or blocks described herein are implemented in a computer program 325; 335, which is loaded into the memory 320 for execution by processing circuitry including one or more processors 310. The processor(s) 310 and memory 320 are interconnected to each other to enable normal software execution. An optional input/output device 340 may also be interconnected to the processor(s) 310 and/or the memory 320 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 310 is thus configured to perform, when executing the computer program 325, well-defined processing tasks such as those described herein.

The processing circuitry does not have to be dedicated to only execute the above-described steps, functions, procedure and/or blocks, but may also execute other tasks.

In a particular embodiment, there is provided a computer program 325; 335 for performing, when executed by a processor 310, power management of an event-based processing system 100.

The computer program 325; 335 comprises instructions, which when executed by the processor 310, cause the processor 310 to:
  obtain information representing a history of arrival times of events, wherein the information comprises arrival timestamps of the events;
  determine a measure for power management based on the timestamps of at least two events represented in the information; and
  take a power management decision based on the determined measure.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 325; 335 may be realized as a computer program product, which is normally carried or stored on a computer-readable medium 320; 330, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Figure 22:
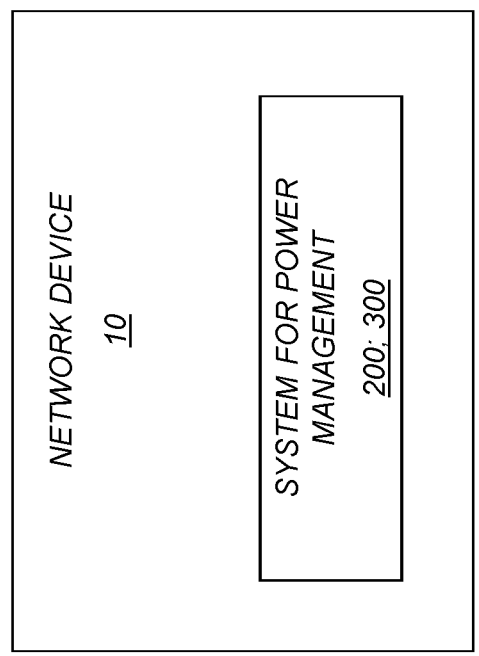
FIG. 22 is a schematic block diagram illustrating an example of a network device according to an embodiment.

FIG. 22 is a schematic block diagram illustrating an example of a network device according to an embodiment. The network device 10 comprises a system 200; 300 configured for power management of an event-based processing system as described herein.

The network device may be any suitable network device in the wireless communication system, or a network device in connection with the wireless communication system. By way of example, the network device may be a suitable network node such a base station or an access point. However, the network device may alternatively be a cloud-implemented network device.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 23:
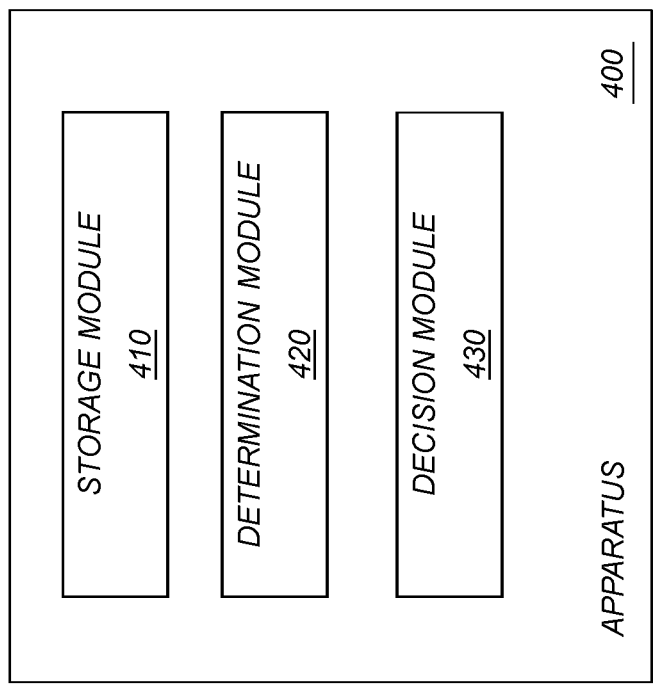
FIG. 23 is a schematic diagram illustrating an example of an apparatus for power management of an event-based processing system.

FIG. 23 is a schematic diagram illustrating an example of an apparatus for power management of an event-based processing system.

The apparatus 400 comprises a storage module 410 for maintaining information representing a history of arrival times of events, wherein the information comprises arrival timestamps of the events, a determination module 420 for determining a measure for power management based on the timestamps of at least two events represented in the information, and a decision module 430 for taking a power management decision based on the determined measure.

Alternatively it is possible to realize the module(s) in FIG. 23 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

Although it may often desirable to centralize functionality in so-called generic data centers, in other scenarios it may in fact be beneficial to distribute functionality over different parts of the network.

Figure 24:
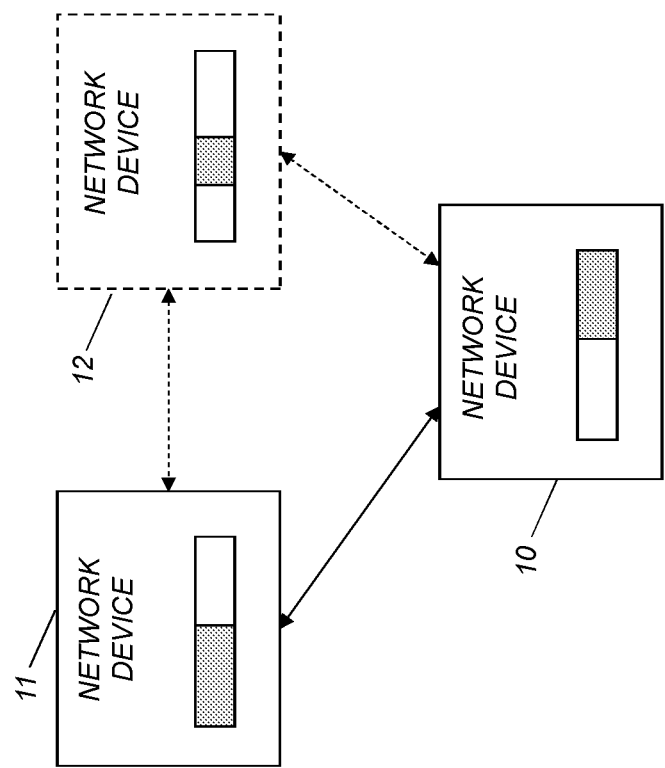
FIG. 24 schematically illustrates a distributed implementation among network devices.

FIG. 24 is a schematic diagram illustrating an example of how functionality can be distributed or partitioned between different network devices in a general case. In this example, there are at least two individual, but interconnected network devices, with reference numerals 10 and 11, respectively, which may have different functionalities, or parts of the same functionality, partitioned between the network devices 10 and 11. There may be one or more additional network devices, with reference numeral 12, being part of such a distributed implementation. The network devices may be part of the same communication system, or one or more of the network devices may be so-called cloud-based network devices located outside of the communication system.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A method for power management of an event-based processing system, wherein the method comprises:
  obtaining information representing a history of arrival times of events, wherein said information comprises arrival timestamps of the events;
  determining a measure for power management by calculating an event rate based on the arrival timestamps of at least two events represented in said information, wherein the arrival timestamps based on which the event rate is calculated are non-consecutive arrival timestamps; and taking a power management action based on the calculated event rate, wherein the step of taking a power management action comprises changing to a higher power state when the calculated event rate is greater than an event rate threshold.

2. The method of claim 1, wherein the step of taking a power management action comprises:
comparing the determined measure for power management to a power management threshold; and
taking the power management action depending on how the determined measure is related to the power management threshold.

3. The method of claim 1, wherein the step of calculating an event rate comprises calculating an event arrival time difference based on the non-consecutive arrival timestamps and calculating the event rate based on the calculated event arrival time difference.

4. The method of claim 1, wherein the step of taking a power management action comprises changing to a lower power state when the calculated event rate is less than a hysteresis adapted threshold, which is defined as the event rate threshold minus a configurable hysteresis level.

5. The method of claim 1, wherein the step of determining a measure for power management comprises:
determining a first representation of arrival timestamps associated with a first set of events and a second representation of arrival timestamps associated with a second set of events; and
determining the measure for power management based on the first representation of arrival timestamps and the second representation of arrival timestamps.

6. The method of claim 1, wherein the information representing a history of arrival times of events is stored in a circular buffer comprising arrival timestamps of K previously arrived events, and the measure for power management is determined based on the arrival timestamp of one of the most recently arrived events and the arrival timestamp located N events back in the buffer, wherein $1 < N \leq K$.

7. The method of claim 1, wherein the step of taking a power management action comprises changing power state in the processing system and/or changing processor frequency.

8. The method of claim 7, wherein the step of changing power state comprises changing P state, C state and/or S state of the processing system, wherein P state refers to a power state associated with processor frequency, C state refers to a power state associated with a power-down mode of a core of the processing system, and S state refers to a power state associated with the processing system overall.

9. The method of claim 1, wherein the information representing a history of arrival times of events is maintained as a continuously updated list of arrival timestamps.

10. The method of claim 1, wherein the events are represented by signal messages or packets.

11. The method of claim 10, wherein the events are represented by packets arriving to the processing system and the arrival timestamps are packet arrival timestamps, and the measure for power management is determined based on the packet arrival timestamps of at least two packets, wherein the arrival timestamps based on which the event rate is calculated are non-consecutive packet arrival timestamps.

12. The method of claim 1, wherein the processing system is a packet processing system arranged in a network environment and the events are represented by network packets arriving to the processing system.

13. The method of claim 1, wherein the processing system is a cascaded processing system comprising at least two processors connected in series, and the method is performed for each of the processors.

14. The method of claim 1, wherein the processing system operates based on at least two virtual machines, and the method is performed for each of the virtual machines.

15. The method of claim 14, wherein the step of taking a power management action comprises keeping track of the relationship between virtual machines and physical processor(s) and managing power management decisions for each of the virtual machines.

16. The method of claim 15, wherein the step of managing the power management decisions for each of the virtual machines comprises merging the power management decisions for two or more virtual machines running on the same physical processor.

17. The method of claim 16, wherein the step of merging the power management decisions for two or more virtual machines running on the same physical processor comprises setting an intermediate power state based on a request for a lower power state from one of the virtual machines and a request for a higher power state from another one of the virtual machines.

18. The method of claim 1, wherein a probing mechanism is performed to provide an estimate for determining at least one power management threshold, and the step of taking a power management action is based on said at least one power management threshold.

19. A system configured for power management of an event-based processing system,
wherein the system is configured to obtain information representing a history of arrival times of events, wherein said information comprises arrival timestamps of the events;
wherein the system is configured to determine a measure for power management by calculating an event rate based on the arrival timestamps of at least two events represented in said information, wherein the arrival timestamps based on which the event rate is calculated are non-consecutive arrival timestamps; and
wherein the system is configured to perform power management based on the calculated event rate, wherein the system is configured to change to a higher power state when the calculated event rate is greater than an event rate threshold.

20. A network device comprising a system configured for power management of an event-based processing system,
wherein the system is configured to obtain information representing a history of arrival times of events, wherein said information comprises arrival timestamps of the events;
wherein the system is configured to determine a measure for power management by calculating an event rate based on the arrival timestamps of at least two events represented in said information, wherein the arrival timestamps based on which the event rate is calculated are non-consecutive arrival timestamps; and
wherein the system is configured to perform power management based on the calculated event rate, wherein the system is configured to change to a higher power state when the calculated event rate is greater than an event rate threshold.

21. The method of claim 10, further comprising:
storing the signal messages or packets representing the events in an event queue where the signal messages or packets are awaiting processing by the processing system; and
storing the arrival timestamps of the events in an information structure separate from the event queue;
wherein the information representing the history of arrival times of the events is obtained from the information structure.

22. The method of claim 10, wherein the information representing a history of arrival times of events is stored in a circular buffer comprising arrival timestamps of K previously arrived events, and the measure for power management is determined based on the arrival timestamp of one of the most recently arrived events and the arrival timestamp located N events back in the buffer, wherein $1<N\leq K$, and wherein the method further comprises:
copying an arrival timestamp from an arrived signal message or packet to the head of the circular buffer;
incrementing a head pointer of the circular buffer;
reading the arrival timestamp located N events back in the buffer; and
calculating the event rate based on a time in-between the copied arrival timestamp and the read arrival timestamp.

* * * * *